United States Patent [19]
Hosokawa et al.

[11] Patent Number: 5,996,645
[45] Date of Patent: Dec. 7, 1999

[54] ALUMINUM ALLOY EXTRUDED SQUARE PIPE EXCELLENT IN AXIALLY COMPRESSIVE PROPERTIES FOR AUTOMOBILE FRONT SIDE MEMBER

[75] Inventors: Toshiyuki Hosokawa, Tokyo; Shigeo Tobaru, Wako, both of Japan

[73] Assignees: The Furukawa Electric Co., Ltd.; Honda Giken Kogyo Kabushiki Kaisha, both of Japan

[21] Appl. No.: 08/816,726

[22] Filed: Mar. 13, 1997

[30] Foreign Application Priority Data

Mar. 22, 1996 [JP] Japan ..................................... 8-066195

[51] Int. Cl.$^6$ ....................................................... F16L 9/00
[52] U.S. Cl. .................... 138/177; 138/172; 138/DIG. 11
[58] Field of Search ..................................... 138/172, 177, 138/178, 174, DIG. 11

[56] References Cited

U.S. PATENT DOCUMENTS

| | | | |
|---|---|---|---|
| 3,941,157 | 3/1976 | Barnett | 138/177 X |
| 4,276,169 | 6/1981 | Browne et al. | 210/404 |
| 4,522,716 | 6/1985 | LaValley | 138/174 X |
| 4,697,292 | 10/1987 | LaValley | 138/172 X |

*Primary Examiner*—Patrick Brinson
*Attorney, Agent, or Firm*—Lorusso & Loud

[57] ABSTRACT

The present invention relates to a member for an automobile front side member, in which the member has a simple sectional shape, is lightweight, is provided with a flat portion for mounting other parts on the member, and is excellent in axially compressive properties in the lengthwise direction against an impact. The member for the front side member according to the present invention comprises an Al alloy extruded square pipe, wherein the inside wall of each corner portion of the square pipe is made thicker than the wall of each side portion of the square pipe. The square pipe of the present invention includes a pipe square or rectangular in sectional shape, or a pipe provided with a flange on the square or rectangular pipe and so on.

10 Claims, 8 Drawing Sheets

FIG. IIA PRIOR ART

FIG. IIB PRIOR ART

ALUMINUM ALLOY EXTRUDED SQUARE PIPE EXCELLENT IN AXIALLY COMPRESSIVE PROPERTIES FOR AUTOMOBILE FRONT SIDE MEMBER

BACKGROUND OF THE INVENTION

1. Field of the Invention

This invention relates to an Al alloy extruded square pipe for use in the structure of an automobile, and more particularly, to an Al alloy extruded square pipe which is an energy absorption member excellent in axially compressive properties in the lengthwise direction for an automobile front side member.

2. Description of the Prior Art

Figure 15:
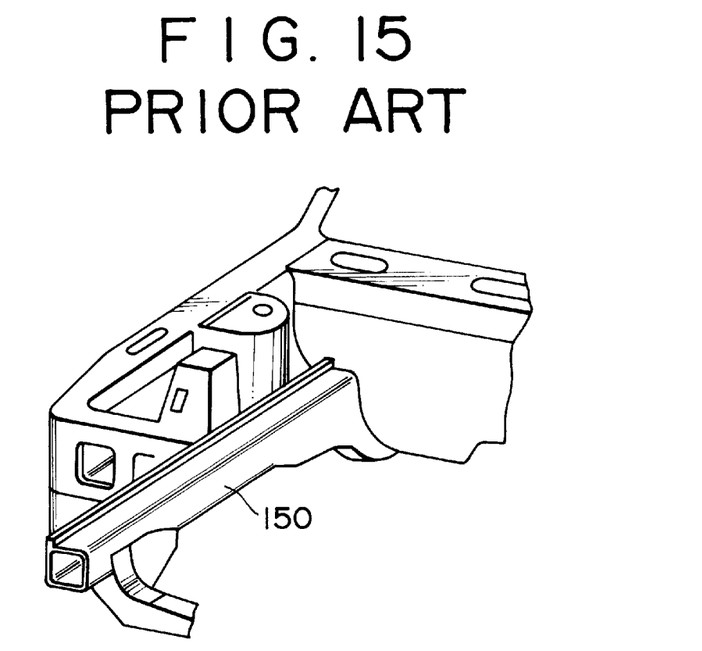
FIG. 15 is a perspective view of an automobile front side member in a prior art.

A member for an automobile front side member (which will be hereinafter simply referred to as also a front side member) as shown by a front side member 150 in FIG. 15 is provided on the left and right sides of an engine room at the front of an automobile, and functions as an absorber which absorbs energy of the shock of impact when happened, resulting in maintaining the safety of users.

As generally known, when the front side member 150 causes multiple buckling deformation so as to be crushed (i.e., so-called accordion buckling) as the result of receiving a compressive load in the lengthwise direction caused by the impact, the buckled front side member absorbs energy more efficiently than the broken or bent front side member.

Figure 16:
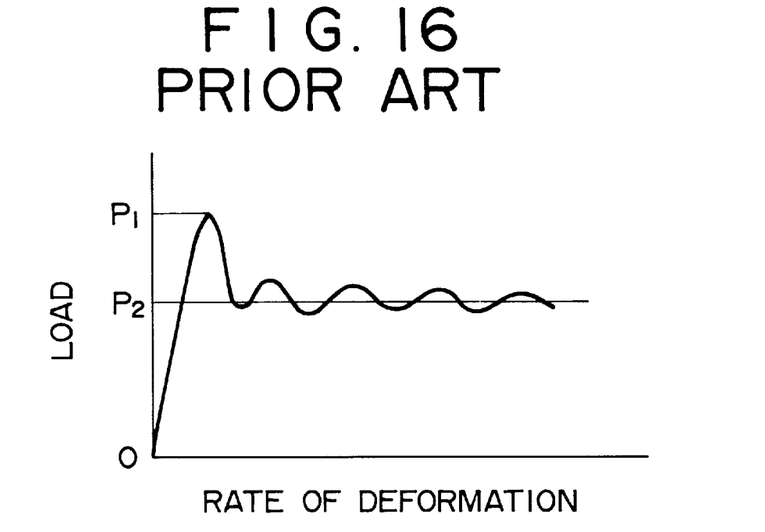
FIG. 16 is a graph of the relation between the load and the rate of deformation of a front side member in an axial compression test.

FIG. 16 shows the relation between the load and the rate of deformation when a compressive load is axially applied to the front side member 150. As shown in FIG. 16, the front side member 150 causes buckling at an initial load P1, and makes rapid progress in deformation at a fixed load (mean load) P2, so that multiple buckling deformation is presented. The initial load P1 is considered to be as low as possible with the intention of reducing the shock of impact when happened, while the fixed load P2 is considered to be as high as possible with the intention of improving energy absorption efficiency.

A front side member is required to be lightweight, be easily formed, be easily installed with various members such as a suspension and an engine and so on.

Conventionally, various types of front side members have been proposed as follows. As shown FIG. 10, for instance, proposed has been a front side member 60 formed by cutting an Al alloy extruded square pipe 61 crosswise into a plurality of members 62 and thereafter integrating these members with each other again by welding, whereby energy of the impact is absorbed by deforming the front side member 60 so as to start from its weld beads 63 (See Japanese Patent Toku-Kai-Sho No. 64-67482). However, the problems with this method are that the manufacturing process is increased in number, and its cost goes up, since this front side member is structured by integrating a large number of members with each other by welding.

Figure 11A:
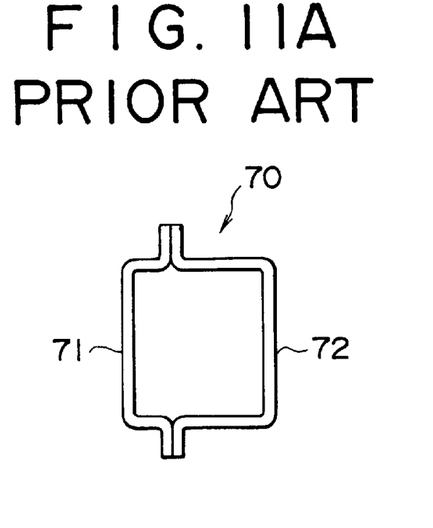
Figure 11B:
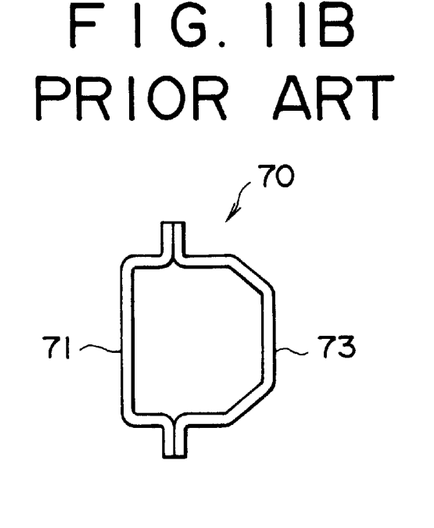
Figure 12:
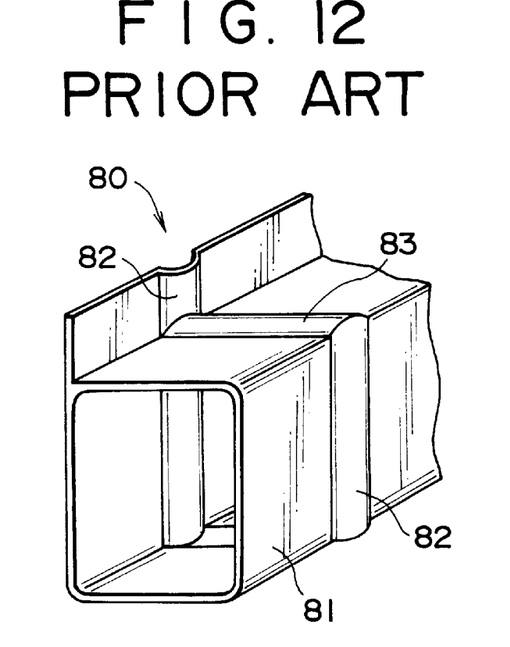
FIG. 12 is a partial perspective view of a front side member in a further prior art.

As shown in FIG. 11, proposed has been a front side member 70, in which members 71, 72 formed by sheet metal processing are welded together into a member approximately square in sectional shape as shown in FIG. 11(a), and an intermediate portion is formed to be pentagonal or more polygonal in sectional shape as shown in FIG. 11(b) (See Japanese Patent Toku-Kai-Hei No. 6-206576). Otherwise, as shown in FIG. 12, proposed has been a front side member 80, in which concave and convex beads 82, 83 are formed at an intermediate portion of an Al alloy extruded square pipe 81 by pressing (See Japanese Patent Toku-Kai-Hei No. 7-52820). The front side member 70 or 80 still presents the problems in that the manufacturing process is increased in number and its cost goes up.

On the other hand, a front side member annular in sectional shape has been also proposed for the purpose of heightening energy absorption efficiency (See Japanese Utility Model Jitsu-Kai-Hei No. 4-108484). However, since this front side member is annular in sectional shape and has no flat portion, it is difficult to mount other members on this front side member.

Figure 13:
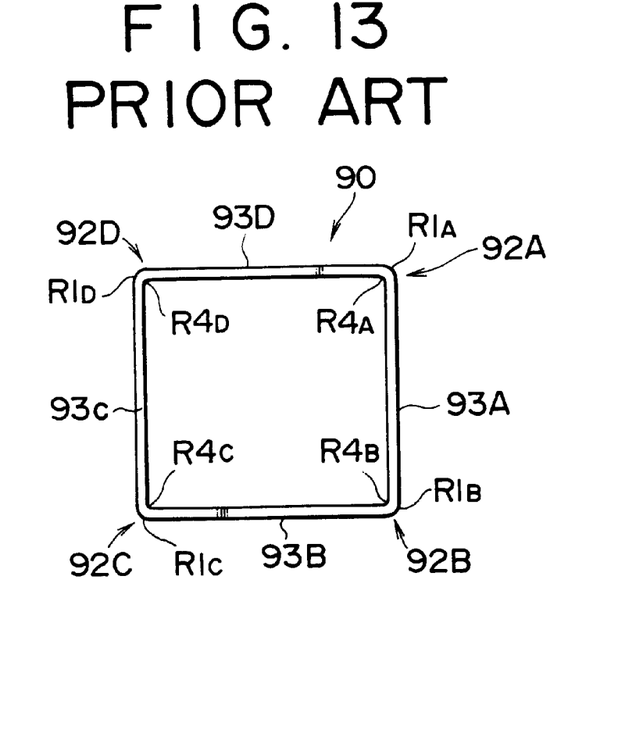
FIG. 13 is a sectional view of a front side member in a still further prior art.

As shown in FIG. 13, proposed has been an Al alloy extruded square pipe 90, in which all four corner portions 92A to 92D and all four side portions 93A to 93D are uniform in wall thickness, for the purpose of reducing the weight or the like. However, this square pipe is still inferior in energy absorption efficiency.

Figure 14:
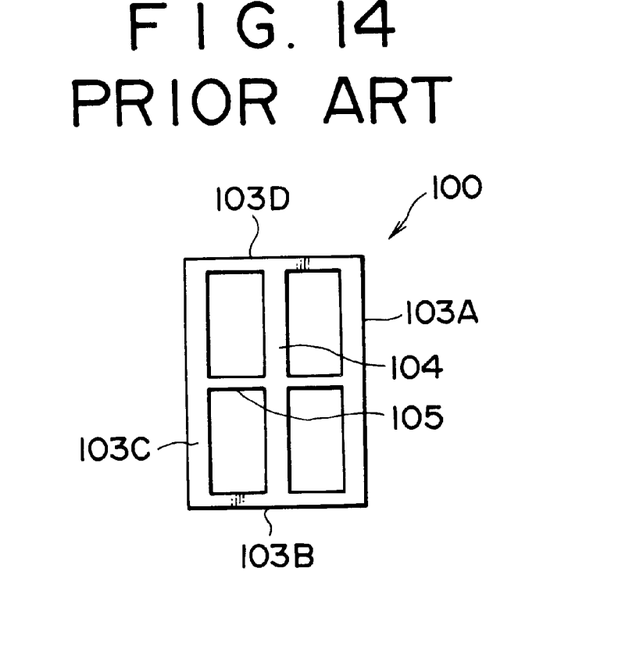
FIG. 14 is a sectional view of a front side member in a yet further prior art.

As shown in FIG. 14, proposed has been a front side member 100 which is a rectangular pipe having the shape, in which a cross is enclosed by a rectangle in section, and composed of an inner longitudinal pillar 104, an inner lateral pillar 105, two longitudinal sides 103A, 103C of a large wall thickness and two lateral sides 103B, 103D of a small wall thickness, whereby even an elongate member easily causes multiple buckling deformation (See Japanese Patent Toku-Kai-Hei No. 6-247338).

However, the problems with the member 100 are that this member has a complicated sectional shape, is hard to be formed by extrusion, and increases in weight.

3. Object of the Invention

It is an object of the present invention to overcome the above problems, and particularly, to provide a member which is used for an automobile front side member and satisfies the requirements in that a member should have a simple sectional shape, be easily formed by extrusion and easily worked subsequently to extrusion, be lightweight as much as possible, be provided with a flat portion for mounting other parts on the member, be excellent in axially compressive properties in the lengthwise direction against an impact, that is, show high energy absorption efficiency and so on.

SUMMARY OF THE INVENTION

For achieving the above object, in the present invention as defined in claim 1, there is provided an Al alloy extruded square pipe excellent in axially compressive properties in the lengthwise direction for an automobile front side member, wherein the inside wall of each corner portion of the square pipe is made thicker than the wall of each side portion of the square pipe.

In the present invention as defined in claim 2, there is provided an Al alloy extruded square pipe excellent in axially compressive properties in the lengthwise direction for an automobile front side member according to claim 1, wherein the inside wall of each corner portion of the square pipe is made thicker than the wall of each side portion of the square pipe by enlarging the inside radius on the inside of each corner portion, or inwardly padding the inside of each corner portion, or thickening the wall on the inside of each corner portion and those of its neighboring side portions.

In the present invention as defined in claim 3, there is provided an Al alloy extruded square pipe excellent in axially compressive properties in the lengthwise direction for an automobile front side member according to claims 1 and 2, wherein the square pipe includes a pipe which is square or rectangular in sectional shape.

In the present invention as defined in claim 4, there is provided an Al alloy extruded square pipe excellent in axially compressive properties in the lengthwise direction for an automobile front side member according to claims 1 to 3, wherein a flange is provided on the outside of the square pipe according to claim 1.

In the present invention as defined in claim 5, there is provided an Al alloy extruded square pipe excellent in axially compressive properties in the lengthwise direction for an automobile front side member according to claims 1 to 4, wherein a rib is further provided at the center on the inside of each side portion of the square pipe according to claim 1.

The present invention as defined in claim 1 relates to an Al alloy extruded square pipe, and more particularly, to an Al alloy extruded square pipe for an automobile front side member, in which the inside wall of each corner portion of the square pipe is made thicker than the wall of each side portion of the square pipe. The inside wall of each corner portion of the square pipe is made thicker than the wall of each side portion of the square pipe in order to reduce the weight of the member as much as possible, and to heighten the mean buckling load of the member in an impact, when happened, that is, to enhance energy absorption efficiency.

Figure 1:
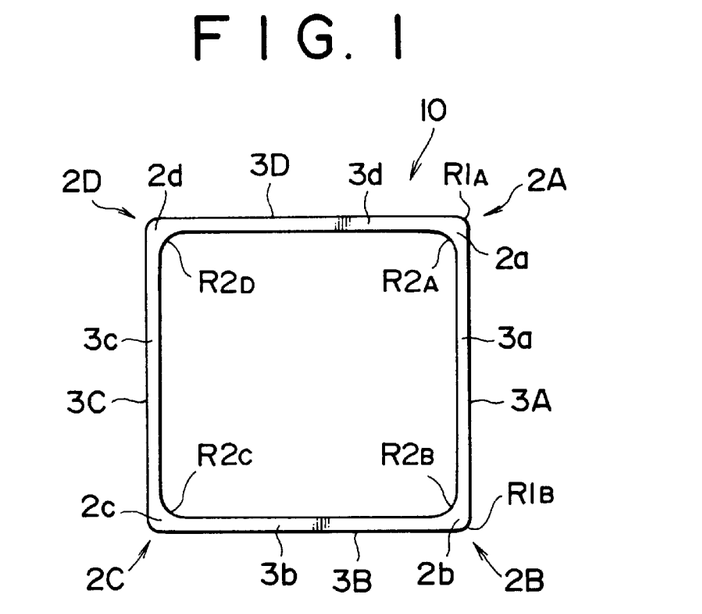
FIG. 1 is a sectional view of an Al alloy extruded square pipe as an embodiment according to the present invention, in which the wall of each corner portion is thickened by enlarging the inside radius of each corner portion in case of a pipe which is square in sectional shape.
Figure 2:
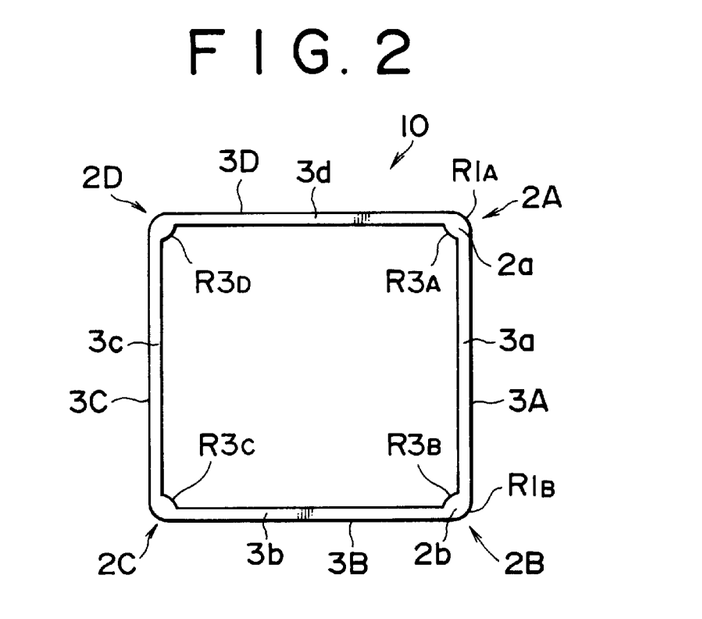
FIG. 2 is a sectional view of an Al alloy extruded square pipe as another embodiment according to the present invention, in which the wall of each corner portion is thickened by providing a projection on the inside of each corner portion in case of a pipe which is square in sectional shape.
Figure 3:
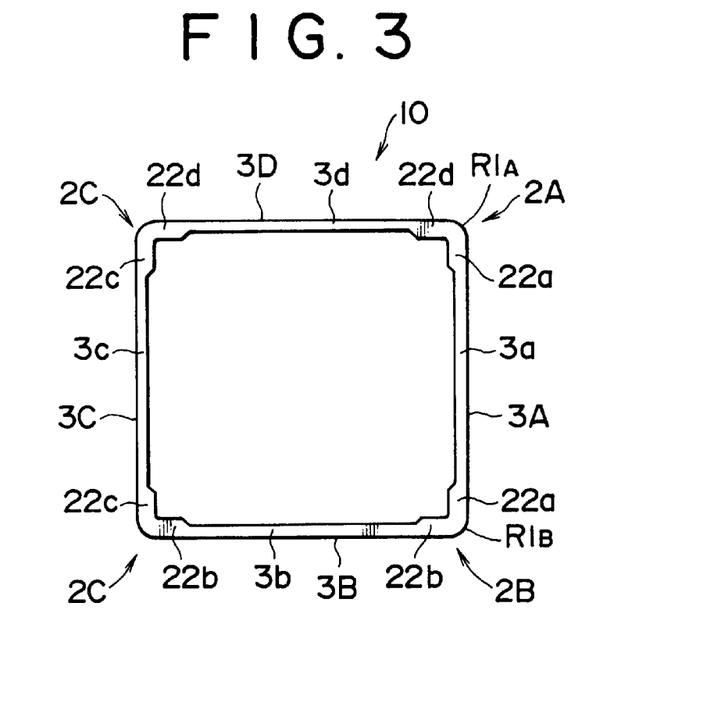
FIG. 3 is a sectional view of an Al alloy extruded square pipe as a further embodiment according to the present invention, in which the wall of each corner portion is thickened by thickening the walls of side portions in the neighborhood of each corner portion in case of a pipe which is square in sectional shape.

The mode of making the inside wall of each corner portion of the square pipe thicker than the wall of each side portion of the square pipe is as described in claim 2, and FIGS. 1 to 3 specifically show the sectional shape of each square pipe in the above mode.

In FIG. 1, reference numerals 2A, 2B, 2C and 2D respectively denote corner portions of a square pipe 10 and 3A, 3B, 3C and 3D respectively denote side portions of the square pipe 10. Further, 2a, 2b, 2c and 2d respectively denote walls of the corner portions, and 3a, 3b, 3c and 3d respectively denote walls of the side portions. R1 represents the outside radius of each corner portion, and R2 represents the inside radius of each corner portion. The walls 2a to 2d of the corner portions 2A to 2D are respectively made thicker than the walls 3a to 3d of the side portions 3A to 3D by enlarging the inside radius R2 of each corner portion.

Referring to FIG. 2, the walls 2a to 2d of the corner portions 2A to 2D are respectively made thicker than the walls 3a to 3d of the side portions 3A to 3D by the projection radius R3 on the inside of each corner portion, instead of the inside radius R2 of each corner portion.

Referring to FIG. 3, the walls 2a to 2d of the corner portions 2A to 2D are respectively made thicker than the walls 3a to 3d of the side portions 3A to 3D by respectively thickening the walls 22a to 22d of the side portions in the neighborhood of the corner portions 2A to 2D.

In each of the square pipes shown in FIGS. 1 to 3, the axial load is applied to the square pipe due to an impact. However, since the walls 3a to 3d are respectively of small thickness and low in strength, the multiple buckling deformation (the deformation in the shape of an accordion) or folds starts from the side portions 3A to 3D, and then affects the corner portions 2A to 2D following the side portions. This deformation is sequentially advanced in the longitudinal direction of the pipe, resulting in causing multiple buckling deformation.

The mean load of the present invention comes to be higher than that in the prior art square pipe having the side portions of uniform wall thickness as shown in FIG. 13, and the increasing rate of mean load of the present invention may be raised in excess of the increasing rate of weight based on that each corner portion of the square pipe of the present invention is thicker than that of the prior art square pipe. Accordingly, the square pipe for the front side member is considered to be excellent in energy absorption efficiency.

Figure 4:
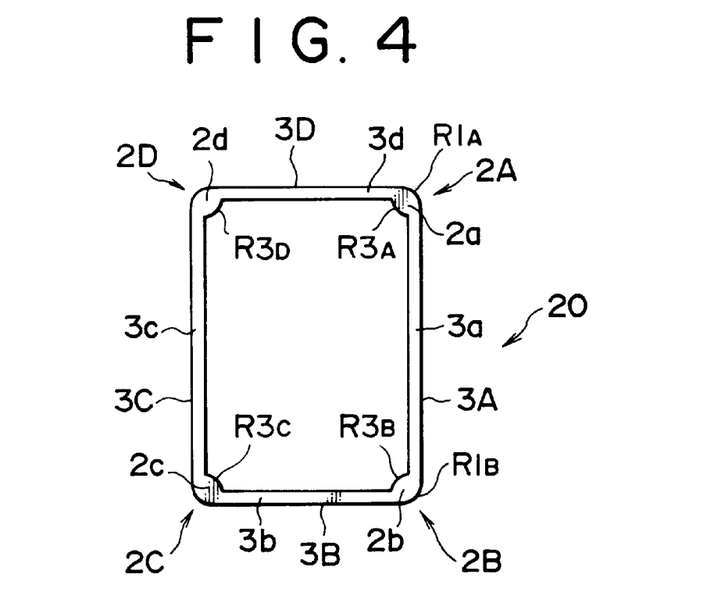
FIG. 4 is a sectional view of a still further embodiment according to the present invention, in case of a pipe which is rectangular in sectional shape.

The pipes shown FIGS. 1 to 3 are square in sectional shape, while a pipe shown in FIG. 4 is rectangular in sectional shape (as defined in claim 3). The mode of thickening the wall of each corner portion of the rectangular pipe shown in FIG. 4 and its effects are similar to those of the square pipes shown in FIGS. 1 to 3.

Figure 5:
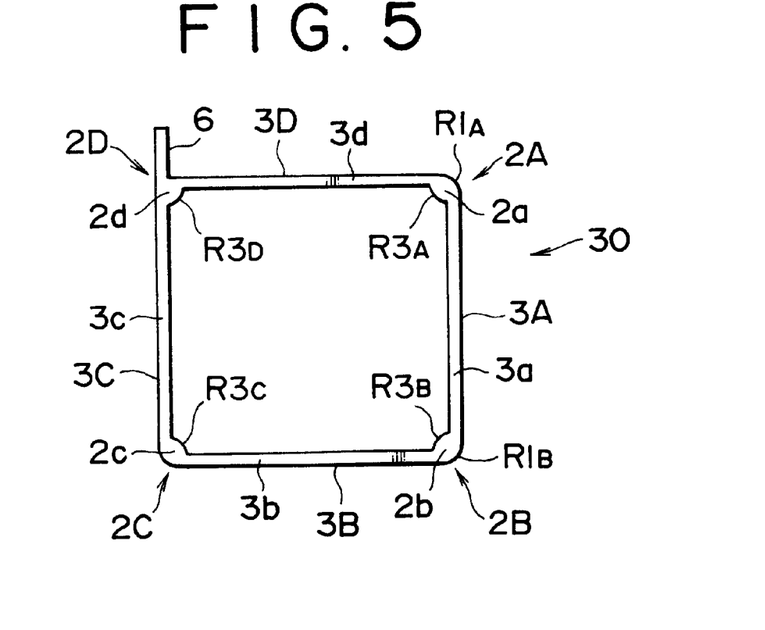
FIG. 5 is a sectional view of a yet further embodiment according to the present invention, in case of an Al alloy extruded square pipe having a flange on the outside of the corner.

A square pipe 30 shown in FIG. 5 further includes a flange 6 integrally provided on the outside of the Al alloy extruded square pipe according to the present invention by extrusion (as defined in claim 4). In this case, the square pipe for the front side member is provided with the flange 6 under the necessity of mounting other automobile members on the square pipe. The shape and effects of the square pipe 30 other than the flange 6 of such a sectional shape are similar to those of the square pipes shown in FIGS. 1 to 3.

Figure 6:
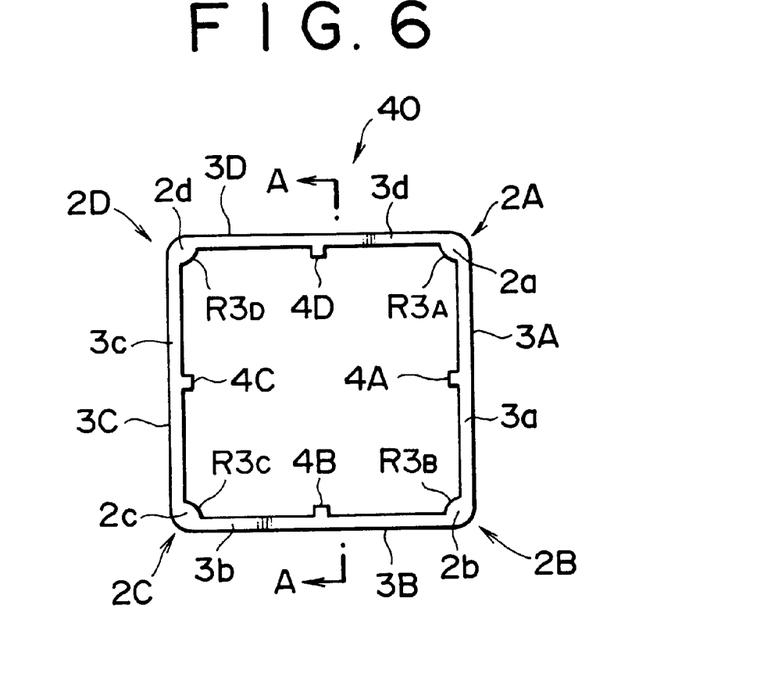
FIG. 6 is a sectional view of a yet further embodiment according to the present invention, in which a plate-like rib is provided approximately at the center on the inside of each side portion of the Al alloy extruded square pipe shown in FIG. 2.

A square pipe 40 shown in FIG. 6 is provided with plate-like projection ribs 4A to 4D approximately at the center on the inside of the side portions 3A to 3D of the square pipe 10 shown in FIG. 2.

Figure 8:
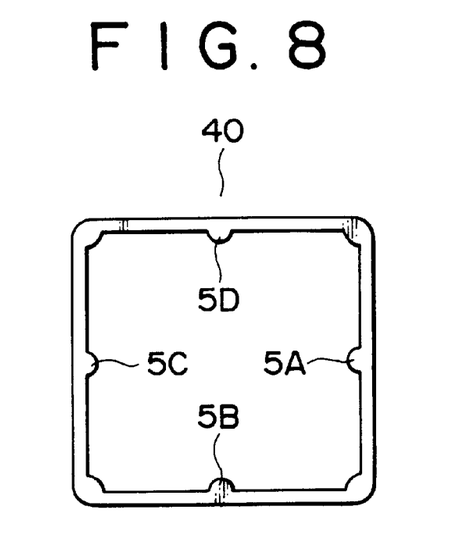
FIG. 8 is a sectional view of a yet further embodiment according to the present invention, in which a semi-circular rib is provided approximately at the center on the inside of each side portion of the Al alloy extruded square pipe shown in FIG. 2.

A square pipe 40 shown in FIG. 8 is provided with semi-circular projection ribs 5A to 5D approximately at the center on the inside of the side portions 3A to 3D of the square pipe 10 shown in FIG. 2.

These plate-like projection ribs or semi-circular projection ribs may be provided in the pipe 10 square in sectional shape as shown in FIGS. 1 and 3, the pipe 20 rectangular in sectional shape as shown in FIG. 4 or the square pipe 30 provided with the flange 6 as shown in FIG. 5 (as defined in claim 5).

The plate-like projection ribs or semi-circular projection ribs are provided in order to heighten the mean buckling load, while reducing the initial load when the buckling deformation is caused against the compression load in the axial direction of the pipe.

In use of each of the above square pipes, a portion of each plate-like projection rib or each semi-circular projection rib of the pipe in the lengthwise direction is cut off. Since buckling starts from the cut-off portions of the ribs, the initial load is reduced, and the remaining ribs are effective in heightening the mean buckling load.

Figure 7:
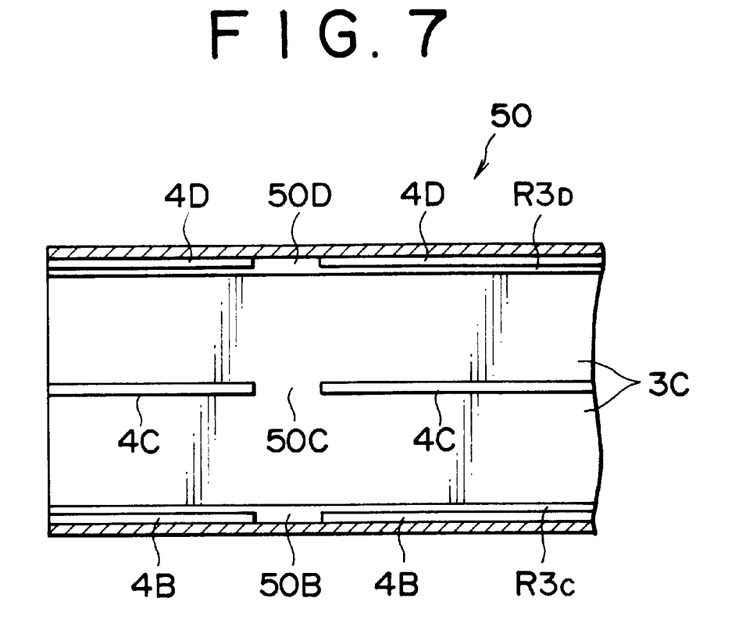
FIG. 7 is a view of an embodiment, in which a portion of each plate-like rib of the Al alloy extruded square pipe shown in FIG. 6 in the lengthwise direction is cut off.

A square pipe 50 shown in FIG. 7 is formed by cutting off portions 50A (not shown), to 50D of the plate-like projection ribs 4A to 4D of the square pipe 40 of FIG. 6 in the lengthwise direction.

Incidentally, an Al alloy applied to the square pipe according to the present invention preferably includes Al—Mg—Si alloy such as JIS6063, 6N01 and 6061 alloys, and Al—Zn—Mg alloy such as JIS7003 and 7N01 alloys. These alloys show excellent in extrudability and are easily formed in a predetermined sectional shape. Further, these alloys enable an increase of strength of a square pipe in a heat treatment subsequent to extrusion. Specifically, the strength may be increased by hot-extruding these alloys into an extruded square pipe of a predetermined shape, then quenching and age-hardening the square pipe. Otherwise, the strength of an extruded square pipe may be increased during air-cool quenching process after hot extrusion and further age-hardening process.

BRIEF DESCRIPTION OF THE DRAWINGS

FIG. 11 is a sectional view of a front side member in another prior art, in which FIG. 11(a) shows a general portion and FIG. 11(b) shows an intermediate portion;

Incidentally, reference numerals described in FIGS. 1 to 16 respectively denote as follows.

10,20,30,40,50: Al alloy extruded square pipe according to the present invention

2A, 2B, 2C, 2D: corner portion of square pipe
2a, 2b, 2c, 2d: wall of corner portion
3A, 3B, 3C, 3D: side portion of square pipe
3a, 3b, 3c, 3d: wall of side portion
R1: radius on outside of corner portion
R2: radius on inside of corner portion
R3: radius of projection on inside of corner portion
22a to 22d: wall of side portion close to corner
4A to 4D: plate-like rib
5A to 5D: semi-circular rib
50A to 50D: cut-off portion of plate-like rib
6: flange
7: test material
77: mounting plate
8: truck
9: barrier
60,70,80,90,100: member for front side member in prior art
61: square pipe portion
62: crosswise cut portion of square pipe
63: weld portion of square pipe
71 to 73: formed sheet portion
82: concave bead
83: convex bead
92A to 92D: corner portion of square pipe
93A to 93D: side portion of square pipe
81: square pipe portion
R4: radius on inside of corner portion
103A to 103D: side portion of square pipe
104: inner longitudinal pillar of square pipe
105: inner lateral pillar of square pipe
150: front side member in prior art

DESCRIPTION OF THE PREFERRED EMBODIMENTS

Hereinafter will be described preferred embodiments (examples of the present invention) according to the present invention in detail in comparison with prior art.

EXAMPLE 1

An Al alloy 6063 (i.e., Al—Mg—Si alloy with Mg content of 0.7% by weight, and Si content of 0.4% by weight) was hot-extruded into a pipe of a square in sectional shape (60 mm length×60 mm width×2 mm wall thickness) as shown in FIGS. 1 to 3. The extruded square pipe was air-cooled, and thereafter age-hardened and heat-treated at a temperature of 180° C. for 8 hours for thermal refining T5.

Table 1 shows the sectional size and sectional area of each test material.

TABLE 1

| Test Material No. | Shape of square pipe (mm) length × width × wall thickness of side | Side of corner portion | Sectional area (Sectional area ratio to No.1) (mm²) | Mean load (Mean load ratio to No. 1) (kgf) |
|---|---|---|---|---|
| Prior Art | | | | |
| 1 | FIG. 13<br>60 × 60 × 2 | R1 = 3 mm R<br>R4 = 1 mm R<br>(Sides and corners of uniform wall thickness) | 457<br>(1.0) | 3920<br>(1.0) |
| 2 | FIG. 1<br>60 × 60 × 2 | R1 = 3 mm R<br>R2 = 4 mm R<br>(Large curvature on inside of corner) | 470<br>(1.03) | 4280<br>(1.09) |
| 3 | FIG. 2<br>60 × 60 × 2 | R1 = 3 mm R<br>R3 = 2 mm R<br>(Projection on inside of corner) | 469<br>(1.03) | 4220<br>(1.08) |
| Embodiment | | | | |
| 4 | FIG. 3<br>60 × 60 × 2 | R1 = 3.5 mm R<br>22 = 2.5 mm × 5.5 mm<br>(Large wall thickness on inside close to corner) | 477<br>(1.04) | 4340<br>(1.11) |
| 5 | FIG. 4<br>70 × 50 × 2 | R1 = 3 mm R<br>R3 = 2 mm R<br>(Projection on inside of corner) | 469<br>(1.03) | 4150<br>(1.06) |
| 6 | FIG. 5<br>60 × 60 × 2<br>Flange 20 × 2 | R1 = 3 mm R<br>R = 2 mm R<br>(Projection on inside of corner) | 509<br>(1.11) | 4500<br>(1.15) |

Figure 9:
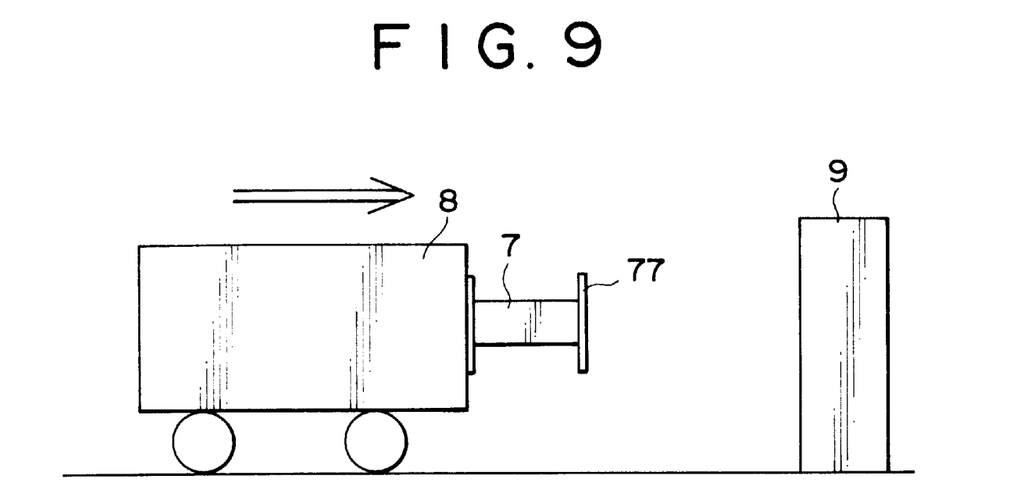
FIG. 9 is a view of an apparatus for testing buckling of a square pipe against an axial impact.

As shown in FIG. 9, the buckling test of these test materials was conducted on condition that two test materials 7 of 300 mm in length are mounted on a truck 8 through a mounting plate 77. Then, the truck was accelerated and run against a barrier 9. The load of the test materials at this time was measured with a load cell installed on the barrier. The energy absorption properties of the test materials were evaluated on the basis of the mean load per test material.

Incidentally, two test materials were mounted on the truck under the necessity of stably deforming the test materials. The weight and velocity of a vehicle body were respectively set to be 2000 Kg and 10 Km/h.

As the result of all the test, the test materials showed multiple buckling in the shape of a line symmetrical along the sectional direction against an axial impact without being bent in mid-course.

Table 1 also shows the mean load of each test material.

In Table 1 showing the sectional area of each test material together with the mean load, each test material of the present invention is larger in sectional area than that in a prior art, as a matter of course. However, the increasing rate of mean load of each material of the present invention is substantially higher than the increasing rate of sectional area, i.e., weight of each material of the present invention. Thus, it is found that the effects based on the shape are produced in the present invention. Namely, this fact shows that a member in the shape of a square pipe having a section like the present invention shows high mean load and excellent energy absorption performance, irrespective of the size of the sectional area.

EXAMPLE 2

The material similar to that in Example 1 was manufactured into a square pipe 40 (See FIG. 6) provided with a plate-like rib (1.5 mm×2 mm) at the center on the inside of each side portion of the square pipe of FIG. 2 in Table 1. Subsequently, a portion (50 mm in length) of each of the plate-like ribs 4A to 4D of the square pipe in the lengthwise direction was cut off to provide cut-off portions 50A to 50D, as shown in FIG. 7.

As the result of conducting a buckling test of each test material of 300 mm in length similarly to that in Example 1, all the test materials showed multiple buckling in the shape of a line symmetrical along the sectional direction against an axial impact without being bent in mid-course.

In this case, the initial load and the mean load were respectively 7600 Kgf and 4510 Kgf, and it was confirmed that although the initial load of the test material having the ribs is equivalent to that of the test material having no rib, the mean load of the test material having the ribs is extremely heightened. (Reference: the initial load and the mean load of the test material having no rib were respectively 7600 Kgf and 4220 Kgf).

Namely, as the result of providing the ribs in the square pipe in this manner, it is possible to extremely heighten the mean load without raising the initial load.

As has been described in the foregoing, the Al alloy extruded square pipe for the automobile front side member according to the present invention has a simple sectional shape, is easily formed by extrusion and also easily worked subsequently to extrusion, and is lightweight.

Further, the square pipe of the present invention meets the requirements in that a member should have a flat portion for mounting other parts on the member, and be excellent in axially compressive properties in the lengthwise direction against an impact when happened, that is, show high energy absorption efficiency. Accordingly, the square pipe of the present invention produces industrially remarkable effects as a member for an automobile front side member.

What is claimed is:

1. An Al alloy extruded square pipe having excellent axial compressive properties and suitable for use as an automobile front side member, said square pipe comprising:

four Al alloy side walls integrally joined at four corners to form an exterior surface for said square pipe; and a flange extending from and integral with at least one of said corners;

wherein the square pipe has a wall thickness at each of said corners greater than its wall thickness in a longitudinally extending portion of each side wall located between two of said corners, and wherein said four side walls define an open interior for said square pipe without subdivision of said open interior by any member.

2. An Al alloy extruded square pipe having excellent axial compressive properties and suitable for use as an automobile front side member, said square pipe comprising:

four Al alloy side walls integrally joined at four corners to form an exterior surface for said square pipe; and a longitudinally extending rib at the center on the inside of each of said side walls;

wherein the square pipe has a wall thickness at each of said corners greater than its wall thickness in a longitudinally extending portion of each side wall located between two of said corners, and wherein said four side walls define an open interior for said square pipe without subdivision of said open interior by any member.

3. An Al alloy extruded square pipe having excellent axial compressive properties and suitable for use as an automobile front side member, said square pipe comprising:

four Al alloy side walls integrally joined at four corners to form an exterior surface for said square pipe;

wherein the square pipe has a wall thickness at each of said corners greater than its wall thickness in a longitudinally extending portion of each side wall located between two of said corners, and wherein said four side walls define an open interior for said square pipe without subdivision of said open interior by any member; and and wherein each of said sidewalls is formed of said first longitudinally extending portion and, integral with said first longitudinally extending portion, second longitudinally extending portions joining said first longitudinally extending portion to two of said corners, said second longitudinally extending portions being thicker than said first longitudinally extending portion.

4. An Al alloy extruded square pipe having excellent axial compressive properties and suitable for use as an automobile front side member, said square pipe comprising:

four Al alloy side walls integrally joined at four corners to form an exterior surface for said square pipe; and a flange extending from and integral with at least one of said corners;

wherein the square pipe is rectangular in cross-section and has a wall thickness at each of said corners greater than its wall thickness in a longitudinally extending portion of each side wall located between two of said corners, and wherein said four side walls define an open interior for said square pipe without subdivision of said open interior by any member.

5. An Al alloy extruded square pipe having excellent axial compressive properties and suitable for use as an automobile front side member, said square pipe comprising:

four Al alloy side walls integrally joined at four corners to form an exterior surface for said square pipe; and a longitudinally extending rib at the center on the inside of each of said side walls;

wherein the square pipe is rectangular in cross-section and has a wall thickness at each of said corners greater than its wall thickness in a longitudinally extending portion of each side wall located between two of said corners, and wherein said four side walls define an open interior for said square pipe without subdivision of said open interior by any member.

6. An Al alloy extruded square pipe having excellent axial compressive properties and suitable for use as an automobile front side member, said square pipe comprising:

four Al alloy side walls integrally joined at four corners to form an exterior surface for said square pipe; and a flange extending from and integral with at least one of said corners;

wherein the square pipe has a wall thickness at each of said corners greater than its wall thickness in a longitudinally extending portion of each side wall located between two of said corners, and wherein said four side walls define an open interior for said square pipe without subdivision of said open interior by any member; and and wherein each of said corners forms exterior and interior curved surfaces and wherein said interior curved surface has a radius larger than the radius of said exterior curved surface.

7. An Al alloy extruded square pipe having excellent axial compressive properties and suitable for use as an automobile front side member, said square pipe comprising:

four Al alloy side walls integrally coined at four corners to form an exterior surface for said square pipe; and a longitudinally extending rib at the center on the inside of each of said side walls;

wherein the square pipe has a wall thickness at each of said corners greater than its wall thickness in a longitudinally extending portion of each side wall located between two of said corners, and wherein said four side walls define an open interior for said square pipe without subdivision of said open interior by any member; and and wherein each of said corners forms exterior and interior curved surfaces and wherein said interior curved surface has a radius larger than the radius of said exterior curved surface.

8. An Al alloy extruded square pipe according to claim 3, wherein said square pipe is square in cross-section.

9. An Al alloy extruded square pipe according to claim 3, further comprising a flange extending from and integral with at least one of said corners.

10. An Al alloy extruded square pipe according to claim 3, further comprising a longitudinally extending rib at the center on the inside of each of said side walls.

* * * * *

UNITED STATES PATENT AND TRADEMARK OFFICE
CERTIFICATE OF CORRECTION

PATENT NO.   : 5,996,645
DATED        : December 7, 1999
INVENTOR(S)  : Toshiyuki Hosokawa et al.

It is certified that error appears in the above-identified patent and that said Letters Patent is hereby corrected as shown below:

Columns 1-8 should be deleted to appear as per attached columns 1-8.

Signed and Sealed this

Tenth Day of September, 2002

Attest:

JAMES E. ROGAN
Director of the United States Patent and Trademark Office

Attesting Officer

ALUMINUM ALLOY EXTRUDED SQUARE PIPE EXCELLENT IN AXIALLY COMPRESSIVE PROPERTIES FOR AUTOMOBILE FRONT SIDE MEMBER

BACKGROUND OF THE INVENTION

1. Field of the Invention

This invention relates to an Al alloy extruded square pipe for use in the structure of an automobile, and more particularly, to an Al alloy extruded square pipe which is an energy absorption member having excellent axial compressive strength and which is suitable for use as an automobile front side member.

2. Description of the Prior Art

An automobile front side member (hereinafter referred to simply as a "front side member"), as represented by a front side member 150 in FIG. 15, is provided on the left and right sides of an engine compartment at the front of an automobile, and functions to absorb the energy of the shock of an impact, thus maintaining the safety of occupants of the automobile.

As generally known, when the front side member 150 undergoes multiple buckling deformation, i.e. is crushed (i.e., so-called accordion buckling), as the result of receiving a compressive load in the lengthwise direction caused by an impact, the buckled front side member absorbs energy more efficiently than a broken or bent front side member.

FIG. 16 shows the relation between the load and the rate of deformation when a compressive load is axially applied to the front side member 150. As shown in FIG. 16, the front side member 150 starts buckling at an initial load P1, and makes rapid progress in deformation at a fixed load (mean load) P2, so that multiple buckling deformation results. The initial load P1 should be as low as possible consistent with the intention of reducing the shock of impact, while the fixed load P2 should be as high as feasible consistent with the intention of improving energy absorption efficiency.

A front side member is required to be lightweight, easily formed, and easily installed in association with various members of the suspension system, the engine, etc.

Conventionally, various types of front side members have been proposed. As shown FIG. 10, for instance, a front side member 60 is formed by cutting an Al alloy extruded square pipe 61 crosswise into a plurality of members 62 and thereafter integrating these members with each other again by welding, whereby energy of the impact is absorbed by deforming the front side member 60, with the deformation starting from its weld beads 63 (See Japanese Patent Toku-Kai-Sho No. 64-67482). However, the problems with this method are that the steps in the manufacturing process are increased in number, and its cost goes up, since this front side member is formed by integrating a large number of members together by welding.

As shown in FIG. 11, a front side member 70 has been proposed, in which members 71, 72 formed by sheet metal working are welded together into a member approximately square in sectional shape, as shown in FIG. 11(a), and an intermediate portion is formed pentagonal, or more polygonal, in sectional shape as shown in FIG. 11(b) (See Japanese Patent Toku-Kai-Hei No. 6-206576). Also proposed, as shown in FIG. 12, is a front side member 80, in which concave and convex beads 82, 83 are formed at an intermediate portion of an Al alloy extruded square pipe 81 by pressing (See Japanese Patent Toku-Kai-Hei No. 7-52820). The front side member 70 or 80 still presents problems in that the steps in the manufacturing process are increased in number and its cost is also increased.

A front side member having an annular sectional shape has been also proposed for the purpose of increasing energy absorption efficiency (See Japanese Utility Model Jitsu-Kai-Hei No. 4-108484). However, since this front-side member is annular in section and has no flat surface, it is difficult to mount other members on this front side member.

As shown in FIG. 13, an Al alloy extruded square pipe 90 has been proposed, in which all four corner portions 92A to 92D, of radii $R4_A$ to $R4_D$, and all four side portions 93A to 93D are uniform in wall thickness, for the purpose of reducing the weight or the like. However, this square pipe has inferior energy absorption efficiency.

As shown in FIG. 14, a front side member 100 has been proposed which is a rectangular pipe, in which a cross is enclosed by a rectangle in section. Thus side member 100 is composed of an inner longitudinal-pillar 104, an inner lateral pillar 105, two longitudinal sides 103A, 103C of a large wall thickness and two lateral sides 103B, 103D of a smaller wall thickness, whereby even an elongate member easily undergoes multiple buckling deformation (See Japanese Patent Toku-Kai-Hei No. 6-247338). However, member 100 has a complicated sectional shape, is hard to form by extrusion, and has increased weight.

OBJECT OF THE INVENTTION

It is an object of the present invention to overcome the above problems, and more particularly, to provide a member which is used for an automobile front side member and which satisfies the requirements of a simple sectional shape, ease of extrusion and ease of working subsequent to extrusion, be as lightweight as possible, have a flat portion for mounting other parts on the member, excellent axial compressive properties upon impact, that is, show high energy absorption efficiency and so on.

SUMMARY OF THE INVENTION

For achieving the above object, the present invention provides an Al alloy extruded square pipe excellent in axial compressive properties and suitable for use as an automobile front side member, wherein the inside wall of each corner portion of the square pipe is thicker than the wall of each side portion of the square pipe.

The inside wall of each corner portion of the square pipe is made thicker than the wall of each side portion of the square pipe by enlarging the inside radius of each corner portion, by inwardly extending the inside of each corner portion to form a convex shape, or by increasing the thickness of wall portions adjacent each corner.

The square pipe may be square or rectangular in cross-section. A flange is optionally provided extending from an exterior corner of the square pipe. Further, a rib may be provided at the inside center of each side portion of the square pipe. The inside wall of each corner portion of the square pipe is made thicker than the wall of each side portion of the square pipe in order to reduce the weight of the member as much as possible, while increasing the mean buckling load of the member in an impact, thus enhancing energy absorption efficiency.

BRIEF DESCRIPTION OF THE DRAWINGS

Figure 10:
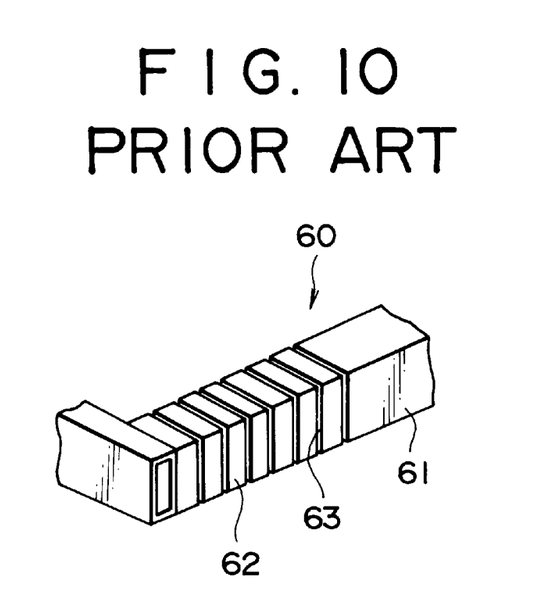
FIG. 10 is a partial perspective view of an automobile front side member in a prior art.

FIG. 1 is a sectional view of an Al alloy extruded square pipe according to a first embodiment of the present invention, wherein the wall of each corner portion is thickened by enlarging the inside radius of each corner portion;

FIG. 2 is a sectional view of an Al alloy extruded square pipe according to a second embodiment of the present invention, in which the wall of each corner portion is thickened by providing a projection on the inside of each corner portion;

FIG. 3 is a sectional view of an Al alloy extruded square pipe according to a third embodiment of the present invention, in which the wall of each corner portion is thickened by thickening portions of the side walls adjoining each corner portion;

FIG. 4 is a sectional view of a fourth embodiment of the present invention, wherein the pipe is rectangular in sectional shape;

FIG. 5 is a sectional view of a fifth embodiment of the present invention, in which the Al alloy extruded square pipe has a flange on the outside of a corner;

FIG. 6 is a sectional view of a sixth embodiment of the present invention in which a plate-like rib is provided approximately at the center of the interior of each side portion of the Al alloy extruded square pipe shown in FIG. 2;

FIG. 7 is a view of an embodiment in which a lengthwise portion of each plate-like rib of the Al alloy extruded square pipe shown in FIG. 6 is cut out;

FIG. 8 is a sectional view of a seventh embodiment of the present invention, in which a semi-circular rib is provided approximately at the center of the interior surface of each side portion of the Al alloy extruded square pipe shown in FIG. 2;

FIG. 9 is a view of an apparatus for testing buckling of a square pipe upon receiving an axial impact;

FIG. 10 is a partial perspective view of an automobile front side member in the prior art;

FIGS. 11(a) and 11(b) are sectional views of another prior art front side member, wherein FIG. 11(a) shows an end portion and FIG. 11(b) shows an intermediate portion;

FIG. 12 is a partial perspective view of yet another prior art front side member;

FIG. 13 is a sectional view of still another prior art front side member;

FIG. 14 is a sectional view of yet another front side member;

FIG. 15 is a perspective view of a prior art automobile front side member of the prior art; and FIG. 16 is a graph of the relationship between the load and the rate of deformation of a front side member in an axial compression test.

DESCRIPTION OF THE PREFERRED EMBODIMENTS

In FIG. 1, reference numerals 2A, 2B, 2C and 2D respectively denote corner portions of a square pipe 10 and 3A, 3B, 3C and 3D respectively denote side portions of the square pipe 10. Further, $2a$, $2b$, $2c$ and $2d$ respectively denote walls of the corner portions, and $3a$, $3b$, $3c$ and $3d$ respectively denote walls of the side portions. R1 represents the outside radius of each corner portion, and R2 represents the inside radius of each corner portion. The walls $2a$ to $2d$ of the corner portions 2A to 2D are respectively made thicker than the walls $3a$ to $3d$ of the side portions 3A to 3D by enlarging the inside radius R2 of each corner portion.

Referring to FIG. 2, the walls $2a$ to $2d$ of the corner portions 2A to 2D are respectively made thicker than the walls $3a$ to $3d$ of the side portions 3A to 3D by provision of a projection of radius R3 on the inside of each corner portion, instead of the inside radius R2 of each corner portion as in FIG. 1.

Referring to FIG. 3, wall portions $22a$ to $22d$ adjacent the corner portions 2A to 2D are thicker than the walls $3a$ to $3d$ of the side portions 3A to 3D.

Each of the square pipes shown in FIGS. 1 to 3, is designed to absorb an axial load applied to the square pipe by an impact.

However, since the walls $3a$ to $3d$ are of smaller thickness and lower in strength, the multiple buckling deformation (deformation in the shape of an accordion) or folding starts from the side portions 3A to 3D, and then affects the corner portions 2A to 2D. This deformation is sequentially advanced in the longitudinal direction of the pipe, resulting in multiple buckling deformation.

The mean load borne by the square pipe of the present invention is higher than that in the prior art square pipe having side portions of uniform wall thickness as shown in FIG. 13, and the increase in mean load with the present invention may be in excess of the increase in weight because each corner portion of the square pipe of the present invention is thicker than that of the prior art square pipe. Accordingly, the square pipe, when used as a front side member, is considered to be excellent in energy absorption efficiency.

Whereas the pipes shown FIGS. 1 to 3 are square in sectional shape, the pipe shown in FIG. 4 is rectangular in sectional shape. The mode of thickening the wall of each corner portion of the rectangular pipe shown in FIG. 4 and its effects are similar to those of the square pipes shown in FIGS. 1 to 3.

A square pipe 30 shown in FIG. 5 further includes a flange 6 integrally provided on the exterior of the Al alloy extruded square pipe according to the present invention by extrusion. In this case, the square pipe for use as a front side member is provided with the flange 6 to facilitate mounting other automobile members on the square pipe. The shape and effects of the square pipe 30 other than the flange 6 of such a sectional shape are similar to those of the square pipes shown in FIGS. 1 to 3.

A square pipe 40 shown in FIG. 6 is provided with plate-like projection ribs 4A to 4D approximately at the center on the interior surfaces of the side portions 3A to 3D of the square pipe 10 shown in FIG. 2.

A square pipe 40 shown in FIG. 8 is provided with semi-circular projection ribs 5A to 5D approximately at the center of the interior surfaces of the side portions 3A to 3D of the square pipe 10 shown in FIG. 2. These plate-like projection ribs or semi-circular projection ribs 5A to 5D may be provided in a pipe 10 which is square in sectional shape as shown in FIGS. 1 and 3, in a pipe 20 which is rectangular in sectional shape as shown in FIG. 4 or in a square pipe 30 provided with the flange 6 as shown in 5.

The plate-like projection ribs or semi-circular projection ribs are provided in order to increase the mean buckling load, while reducing the initial load when the buckling formation is initiated by a compression load in the axial direction of the pipe.

In use of each of the above square pipes, a lengthwise portion of each plate-like projection rib or each semicircular projection rib of the pipe is cut out. Since buckling starts at the points where the rib lengths are cut out, the initial load is reduced, and the remaining rib lengths are effective in increasing the mean buckling load.

A square pipe 50 shown in FIG. 7 is formed by cutting out lengthwise portions 50A (not shown) to 50D of the plate-like projection ribs 4A to 4D of the square pipe 40 of FIG. 6.

Al alloy forming the square pipe according to the present invention is preferably an Al—Mg—Si alloy such as JIS6063, 6N01 and 6061 alloys, or Al—Zn—Mg alloy such as JIS7003 and 7N01 alloys. These alloys show excellent extrudability and are easily formed with a predetermined sectional shape. Further, these alloys enable an increase of strength of a square pipe by heat treatment subsequent to extrusion. Specifically, the strength may be increased by hot-extruding these alloys into an extruded square pipe of a predetermined shape, then quenching and age-hardening the square pipe. Otherwise, the strength of an extruded square pipe may be increased during air quenching after hot extrusion, followed by an age-hardening process.

Preferred embodiments (examples of the present invention) according to the present invention will now be compared with the prior art.

EXAMPLE 1

An Al alloy 6063 (i.e., Al—Mg—Si alloy with a Mg content of 0.7% by weight, and a Si content of 0.4% by weight) was hot-extruded into a pipe of a square sectional shape (60 mm length×60 mm width×2 mm wall thickness) as shown in FIGS. 1 to 3. The extruded square pipe was air-cooled, and thereafter age-hardened and heat-treated at a temperature of 180° C. for 8 hours for thermal refining T5.

Table 1 shows the sectional size and sectional area of each test material.

TABLE 1

| Test Material No. | Shape of square pipe (mm) length × width × wall thickness of side | Side of corner portion | Sectional area (Sectional area ratio to No. 1) (mm$^2$) | Mean load (Mean load ratio to No. 1) (kgf) |
|---|---|---|---|---|
| | | Prior Art | | |
| 1 | FIG. 13<br>60 × 60 × 2 | R1 = 3 mmR<br>R4 = 1 mmR<br>(Sides and corners of uniform wall thickness) | 457<br>(1.0) | 3920<br>(1.0) |
| 2 | FIG. 1<br>60 × 60 × 2 | R1 = 3 mmR<br>R2 = 4 mmR<br>(Large curvature on inside of corner) | 470<br>(1.03) | 4280<br>(1.09) |
| 3 | FIG. 2<br>60 × 60 × 2 | R1 = 3 mmR<br>R3 = 2 mmR<br>(Projection on inside of corner) | 469<br>(1.03) | 4220<br>(1.08) |
| | | Embodiment | | |
| 4 | FIG. 3<br>60 × 60 × 2 | R1 = 3.5 mmR<br>R2 = 2.5 mm × 5.5 mm<br>(Large wall thickness on inside close to corner) | 477<br>(1.04) | 4340<br>(1.11) |
| 5 | FIG. 4<br>70 × 50 × 2 | R1 = 3 mmR<br>R3 = 2 mmR<br>(Projection on inside of corner) | 469<br>(1.03) | 4150<br>(1.06) |

TABLE 1-continued

| Test Material No. | Shape of square pipe (mm) length × width × wall thickness of side | Side of corner portion | Sectional area (Sectional area ratio to No. 1) (mm$^2$) | Mean load (Mean load ratio to No. 1) (kgf) |
|---|---|---|---|---|
| 6 | FIG. 5<br>60 × 60 × 2<br>Flange 20 × 2 | R1 = 3 mmR<br>R3 = 2 mmR<br>(Projection on inside of corner) | 509<br>(1.11) | 4500<br>(1.15) |

FIG. 9 illustrates a buckling test wherein two test members 7 of 300 mm in length are mounted on a truck 8 through a mounting plate 77. Then, the truck was accelerated and run against a barrier 9. The load on the test materials at this time was measured by a load cell installed on the barrier. The energy absorption properties of the test members were evaluated as the mean load.

The two test members were mounted on the truck in a manner providing stable deforming. The weight and velocity of the vehicle body were respectively 2000 Kg and 10 Km/h.

As the result of such impact tests, the test members showed multiple buckling along lines symmetrical in section, without being bent in mid-course.

Table 1 also shows the mean load of each test member.

Table 1 gives the sectional area of each test member together with the mean load. Each test member in accordance with the present invention is larger in sectional area than the prior art member, as a matter of course. However, the increase in the mean load for each member of the present invention is substantially higher than the increase sectional area (and weight) of each member of the present invention. Thus, it is found that the improvement provided by the present invention is based on the shape. More specifically, these tests show that a member in the shape of a square pipe having a section in accordance with the present invention shows high mean load and excellent energy absorption performance, irrespective of the size of its sectional area.

EXAMPLE 2

Members similar to those employed in Example 1, i.e. a square pipe 40 (See FIG. 6), were provided with a plate-like rib (1.5 mm×2 mm) at the center of the interior surface of each side portion of the square pipe of FIG. 2 in Table 1. Subsequently, a 50 mm length of each of the plate-like ribs 4A to 4D of the square pipe was cut out to provide cut-outs 50A to 50D, as shown in FIG. 7.

As the result of buckling tests on 300 mm lengths of these test members, similar to that of Example 1, all the test members showed multiple buckling lines symmetrical in section, without being bent in mid-course.

In this case, the initial load and the mean load were respectively 7600 Kgf and 4510 Kgf, and it was confirmed that although the initial load of the test material having the ribs is equivalent to that of the test material having no rib, the mean load of the test material having the ribs is much higher (the initial load and the mean load of the test material having no rib were respectively 7600 Kgf and 4220 Kgf).

Thus, as a result of providing the ribs in the square pipe in this manner, it is possible to greatly increase the mean load without raising the initial load.

As has been described in the foregoing, the Al alloy extruded square pipe for use as the automobile front side member according to the present invention has a simple sectional shape, is easily formed by extrusion, is also easily worked subsequent to extrusion, and is lightweight.

Further, the square pipe of the present invention meets the requirements of a flat surface portion for mounting other parts on the member, and excellent axial compressive properties upon impact. Thus, structural members in accordance with the present invention show high energy absorption efficiency and are well suited for use as an automobile front side member.

What is claimed is:

1. An Al alloy extruded square pipe having excellent axial compressive properties and suitable for use as an automobile front side member, said square pipe comprising:

four Al alloy side walls integrally joined at four corners to form an exterior surface for said square pipe; and a flange extending from and integral with at least one of said corners;

wherein the square pipe has a wall thickness at each of said corners greater than its wall thickness in a longitudinally extending portion of each side wall located between two of said corners, and wherein said four side walls define an open interior for said square pipe without subdivision of said open interior by any member.

2. An Al alloy extruded square pipe having excellent axial compressive properties and suitable for use as an automobile front side member, said square pipe comprising:

four Al alloy side walls integrally joined at four corners to form an exterior surface for said square pipe; and a longitudinally extending rib at the center on the inside of each of said side walls;

wherein the square pipe has a wall thickness at each of said corners greater than its wall thickness in a longitudinally extending portion of each side wall located between two of said corners, and wherein said four side walls define an open interior for said square pipe without subdivision of said open interior by any member.

3. An Al alloy extruded square pipe having excellent axial compressive properties and suitable for use as an automobile front side member, said square pipe comprising:

four Al alloy side walls integrally joined at four corners to form an exterior surface for said square pipe;

wherein the square pipe has a wall thickness at each of said corners greater than its wall thickness in a longitudinally extending portion of each side wall located between two of said corners, and wherein said four side walls define an open interior for said square pipe without subdivision of said open interior by any member; and and wherein each of said sidewalls is formed of said first longitudinally extending portion and, integral with said first longitudinally extending portion, second longitudinally extending portions joining said first longitudinally extending portion to two of said corners, said second longitudinally extending portions being thicker than said first longitudinally extending portion.

4. An Al alloy extruded square pipe having excellent axial compressive properties and suitable for use as an automobile front side member, said square pipe comprising:

four Al alloy side walls integrally coined at four corners to form an exterior surface for said square pipe; and a flange extending from and integral with at least one of said corners;

wherein the square pipe is rectangular in cross-section and has a wall thickness at each of said corners greater than its wall thickness in a longitudinally extending portion of each side wall located between two of said corners, and wherein said four side walls define an open interior for said square pipe without subdivision of said open interior by any member.

5. An Al alloy extruded square pipe having excellent axial compressive properties and suitable for use as an automobile front side member, said square pipe comprising:

four Al alloy side walls integrally joined at four corners to form an exterior surface for said square pipe; and a longitudinally extending rib at the center on the inside of each of said side walls;

wherein the square pipe is rectangular in cross-section and has a wall thickness at each of said corners greater than its wall thickness in a longitudinally extending portion of each side wall located between two of said corners, and wherein said four side walls define an open interior for said square pipe without subdivision of said open interior by any member.

6. An Al alloy extruded square pipe having excellent axial compressive properties and suitable for use as an automobile front side member, said square pipe comprising:

four Al alloy side walls integrally joined at four corners to form an exterior surface for said square pipe; and a flange extending from and integral with at least one of said corners;

wherein the square pipe has a wall thickness at each of said corners greater than its wall thickness in a longitudinally extending portion of each side wall located between two of said corners, and wherein said four side walls define an open interior for said square pipe without subdivision of said open interior by any member; and and wherein each of said corners forms exterior and interior curved surfaces and wherein said interior curved surface has a radius larger than the radius of said exterior curved surface.

7. An Al alloy extruded square pipe having excellent axial compressive properties and suitable for use as an automobile front side member, said square pipe comprising:

four Al alloy side walls integrally joined at four corners to form an exterior surface for said square pipe; and a longitudinally extending rib at the center on the inside of each of said side walls;

wherein the square pipe has a wall thickness at each of said corners greater than its wall thickness in a longitudinally extending portion of each side wall located between two of said corners, and wherein said four side walls define an open interior for said square pipe without subdivision of said open interior by any member; and wherein each of said corners forms exterior and interior curved surfaces and wherein said interior curved surface has a radius larger than the radius of said exterior curved surface.

8. An Al alloy extruded square pipe according to claim 3, wherein said square pipe is square in cross-section.

9. An Al alloy extruded square pipe according to claim 3, further comprising a flange extending from and integral with at least one of said corners.

10. An Al alloy extruded square pipe according to claim 3, further comprising a longitudinally extending rib at the center on the inside of each of said side walls.

* * * * *